(12) United States Patent
Lin (10) Patent No.: US 8,863,392 B2
(45) Date of Patent: Oct. 21, 2014

(54) GRAFTING PRUNER

(76) Inventor: Thomas Lin, Taichung (TW)

( * ) Notice: Subject to any disclaimer, the term of this patent is extended or adjusted under 35 U.S.C. 154(b) by 265 days.

(21) Appl. No.: 13/597,621

(22) Filed: Aug. 29, 2012

(65) Prior Publication Data

US 2014/0059865 A1   Mar. 6, 2014

(51) Int. Cl.
  *B26B 17/00*   (2006.01)
(52) U.S. Cl.
  USPC .................................. 30/131; 30/134; 30/184
(58) Field of Classification Search
  USPC ............ 30/112, 113, 184, 131, 132, 123, 134
  See application file for complete search history.

(56) References Cited

U.S. PATENT DOCUMENTS

| | | | | |
|---|---|---|---|---|
| 2,541,063 A | * | 2/1951 | Hubbard | ........................ 30/124 |
| 4,392,304 A | * | 7/1983 | Plesa | ............................... 30/178 |
| 4,561,282 A | * | 12/1985 | Hadden, Sr. | ............... 72/409.08 |
| 5,033,194 A | * | 7/1991 | Long | ............................... 30/241 |
| 5,373,639 A | * | 12/1994 | Huang | ............................. 30/92 |
| 6,711,930 B2 | * | 3/2004 | Thom et al. | ................. 72/409.01 |
| 7,451,544 B1 | * | 11/2008 | Huang | ............................. 30/123 |

* cited by examiner

*Primary Examiner* — Sean Michalski
(74) *Attorney, Agent, or Firm* — Muncy, Geissler, Olds & Lowe, P.C.

(57) ABSTRACT

A grafting pruner includes a first handle and a second handle pivotally connected together, a fixed cutter holder affixed to the first handle, a link affixed to the second handle, a cutter assembly mounted between the fixed cutter holder and the link. A pivot device is inserted through an arched sliding slot of the fixed cutter holder, an axle hole of the link and a longitudinal sliding slot of the cutter blade assembly to secure the fixed cutter blade, the link and the cutter blade assembly together. During relative movement between the first and second handles subject to an external force, the link will be forced by the second handle to move along the arched sliding slot, pushing the cutter blade assembly toward the first handle to cut a living shoot or bud off a plant.

10 Claims, 8 Drawing Sheets

GRAFTING PRUNER

BACKGROUND OF THE INVENTION

1. Field of the Invention

The present invention relates to grafting tools and more particularly, to grafting pruner, which has the characteristics of compact size and ease of use.

2. Description of the Related Art

Grafting is a horticultural technique whereby a living shoot or bud from one tree is fixed into another tree to form a new growth. Its main purpose is to improve the quality of fruits and vegetables, shorten the growing of fruits and vegetables, increase the production of fruits and vegetables, and change the growing seasons of fruits and vegetables.

Before grafting, growers normally use a grafting pruner to cut selected branches or buds, and then fix the cut branches or buds into the stems or roots of target plants. However, conventional grafting pruners are commonly bulky and inconvenient to carry. Further, conventional grafting pruners do not allow replacement of the cutter blade subject to the desired cut. The shape of the cut, however, is an important factor of graft success. Thus, improvements on conventional grafting pruners are desired.

SUMMARY OF THE INVENTION

The present invention has been accomplished under the circumstances in view. It is one object of the present invention to provide a grafting pruner, which has a compact size and is convenient to carry.

To achieve this and other objects of the present invention, a grafting pruner comprises a first handle comprising a working portion located on a top end thereof and a first grip located on a bottom end thereof; a second handle pivotally connected with a top end thereof to the first handle, comprising a second grip located on a bottom end thereof corresponding to the first grip of the first handle; a link fixedly connected with a bottom end thereof to the top end of the second handle and synchronously biasable with the second handle relative to the first handle, comprising an axle hole at a top end thereof; a fixed cutter holder affixed to one side of the working portion of the first handle, comprising an arched sliding slot disposed in communication with the axle hole of the link; a pivot device inserted through the axle hole of the link and the arched sliding slot of the fixed cutter holder to connect the link and the fixed cutter holder together for allowing the pivot device to be forced by the link to move along the arched sliding slot of the fixed cutter holder; and a cutter blade assembly comprising a movable cutter holder set between the link and the fixed cutter holder and a cutter blade affixed to the movable cutter holder. The movable cutter holder comprises a longitudinal sliding slot disposed in communication with the axle hole of the link and the arched sliding slot of the fixed cutter holder and coupled to the pivot device for allowing the movable cutter holder to be pushed by the pivot device to move the cutter blade relative to the working portion of the first handle in cutting a living shoot or bud off a plant.

In the grafting pruner provided by the present invention, the fixed cutter holder is affixed to the first handle by a plurality of screw bolt and nut sets. The cutter blade assembly and the fixed cutter holder can be detached from the grafting pruner for replacement of the cutter blade after unfastened the screw bolt and nut sets.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
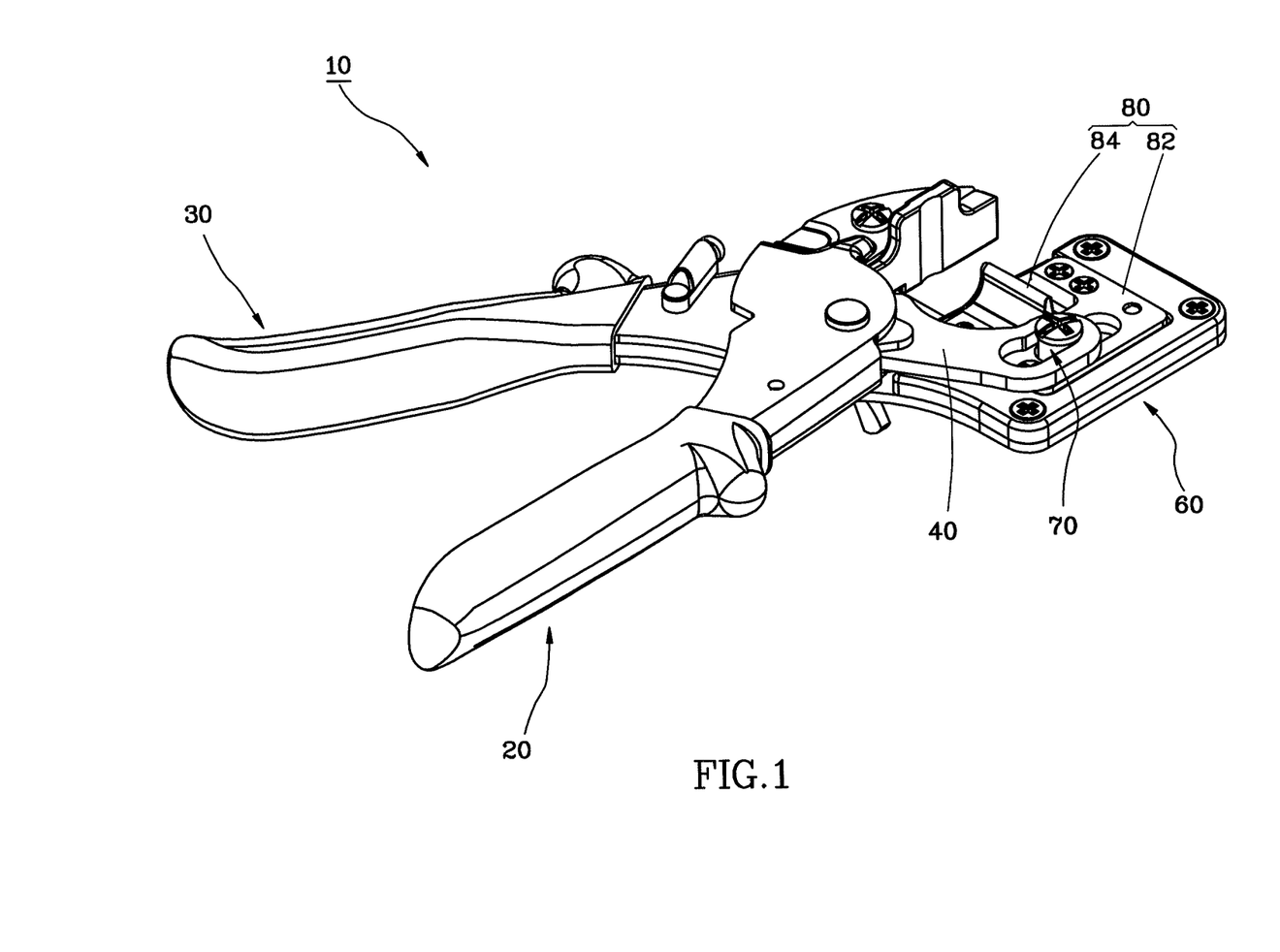
FIG. 1 is an perspective view of a grafting pruner in accordance with a first embodiment of the present invention.
Figure 2:
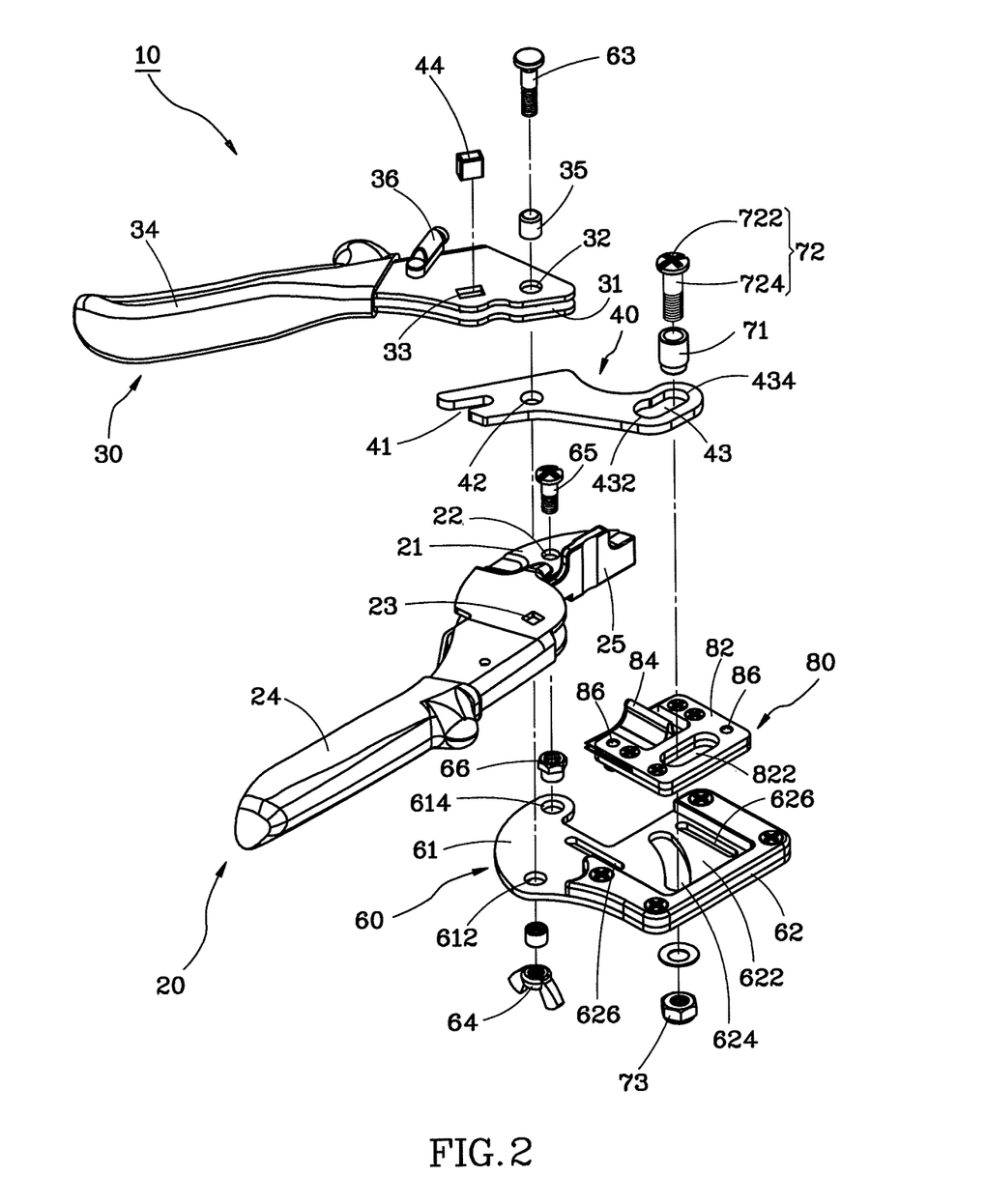
FIG. 2 is an exploded view of the grafting pruner in accordance with the first embodiment of the present invention.

Referring to FIGS. 1 and 2, a grafting pruner 10 in accordance with a first embodiment of the present invention is shown. The grafting pruner 10 comprises a first handle 20, a second handle 30, a link 40, an elastic member 50, a fixed cutter holder 60, a pivot device 70, and a cutter blade assembly 80.

The first handle 20 comprises a working portion 21 disposed at a top end thereof, a first through hole 22 cut through the working portion 21, a first pivot hole 23 located on the middle part thereof, a first grip 24 disposed at a bottom end thereof for gripping by the user, and an anvil 25 affixed to the working portion 21.

The second handle 30 comprises a clamping slot 31 disposed at a top end thereof, a second pivot hole 32 cut through the clamping slot 31, a locating hole 33 disposed in communication with the clamping slot 31, and a second grip 34 disposed at a bottom end thereof and corresponding to the first grip 24 for gripping by the user. Further, a bushing 35 is inserted into the first pivot hole 23 of the first handle 20 and the second pivot hole 32 of the second handle 30 to secure the first handle 20 and the second handle 30 together, enabling the first handle 20 and the second handle 30 to be biased relative to each other by an external force.

The link 40 comprises a locating notch 41 disposed at a bottom end thereof, a third pivot hole 42 disposed near the locating notch 41, and an axle hole 43 disposed at a top end thereof. In this embodiment, the axle hole 43 is an elongated hole defining a large diameter end 432 and a small diameter end 434. During installation, the bottom end of the link 40 is inserted into the clamping slot 31 of the second handle 30 for enabling the bushing 35 to be inserted into the third pivot hole 42, and then a wedge block 44 is plugged into the locating hole 33 of the second handle 30 and the locating notch 41 of the link 40 to affix the link 40 to the second handle 30, enabling the link 40 to be biased with the second handle 30 relative to the first handle 20.

Figure 3:
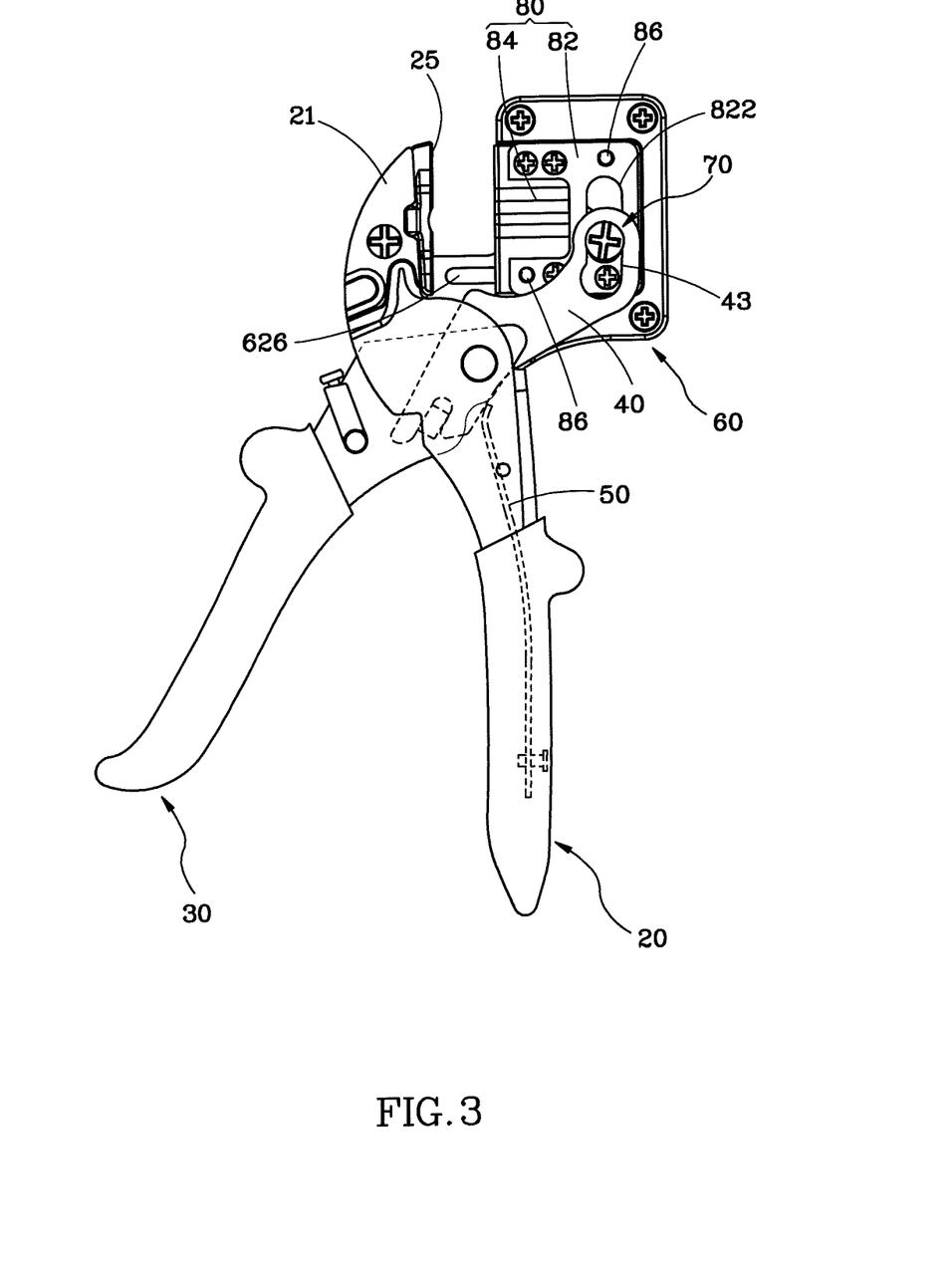
FIG. 3 is a schematic plain view of the first embodiment of the present invention, illustrating the grafting pruner in the opened status.

The elastic member 50 is accommodated inside the first handle 20, as shown in FIG. 3, having its one end affixed to the first grip 24 of the first handle 20 and its other end stopped against the bottom end of the link 40 to apply a force to the second handle 30 against the first handle 20, keeping the first handle 20 and the second handle 30 is an open condition.

The fixed cutter holder 60 comprises a first holder body portion 61, a second holder body portion 62, a first mounting hole 612 and a second mounting hole 614 located on the first holder body portion 61 and spaced from each other at a distance, an accommodation open chamber 622 defined in the second holder body portion 62, an arched sliding slot 624 cut through the second holder body portion 62 and disposed in communication with the accommodation open chamber 622, and two transverse sliding slots 626 cut through the second holder body portion 62 and disposed at opposing top and bottom sides relative to the arched sliding slot 624. During installation, a first screw bolt 63 with a first screw nut 64 and a second screw bolt 65 with a second screw nut 66 are respectively fastened to the working portion 21 of the first handle 20, wherein the first screw bolt 63 is inserted through the first bushing 35 and the first mounting hole 612 of the fixed cutter holder 60; the second screw bolt 65 is inserted through the first through hole 22 of the first handle 20 and the second mounting hole 614 of the fixed cutter holder 60.

The pivot device 70 is coupled between the link 40 and the cutter holder 60, comprising a second bushing 71, a third screw bolt 72 and a third screw nut 73. The second bushing 71 is inserted through the axle hole 43 of the link 40 and the arched sliding slot 624 of the fixed cutter holder 60. The third screw bolt 72 comprises a head 722 and a threaded shank 724 extended from one side of the head 722. The head 722 has a diameter greater than the small diameter end 434 of the link 40 but smaller than the large diameter end 432 of the link 40. The threaded shank 724 is inserted through the second bushing 71 out of the fixed cutter holder 60. The third screw nut 73 is threaded onto the end of the threaded shank 724 of the third screw bolt 72. Thus, the pivot device 70 can be forced by the link 40 to move along the arched sliding slot 624 of the fixed cutter holder 60.

The cutter blade assembly 80 comprises a movable cutter holder 82, and a cutter blade 84 affixed to the movable cutter holder 82. The movable cutter holder 82 is accommodated in the accommodation open chamber 622 of the fixed cutter holder 60 between the link 40 and the fixed cutter holder 60, and connected to the fixed cutter holder 60 by two sliding guide members 86 that are respectively slidably coupled to the transverse sliding slots 626 of the fixed cutter holder 60. Further, the movable cutter holder 82 comprises a longitudinal sliding slot 822, which is kept in communication with the axle hole 43 of the link 40 and the arched sliding slot 624 of the fixed cutter holder 60 for the passing of the threaded shank 724 of the third screw bolt 72 of the pivot device 70.

Figure 4:
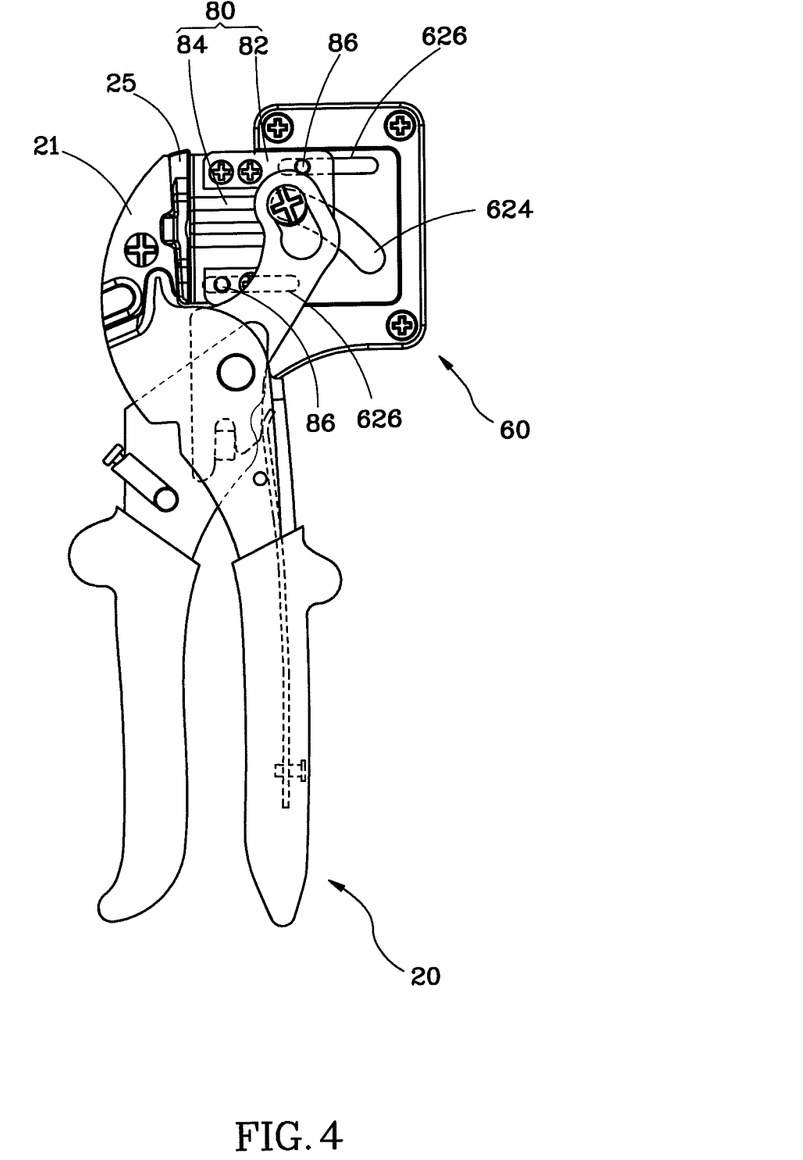
FIG. 4 is similar to FIG. 3, illustrating the grafting pruner in the closed status.

When in use, the user can hold the first handle 20 and the second handle 30 with one single hand to force them toward each other. At this time, the pivot device 70 will be forced by the link 40 to move along the arched sliding slot 624 of the fixed cutter holder 60 toward the working portion 21 of the first handle 20, and also to move upwardly along the longitudinal sliding slot 822 of the movable cutter holder 72. During this sliding movement, the pivot device 70 will be forced against the peripheral wall of the longitudinal sliding slot 822 to move the movable cutter holder 82, forcing the cutter blade assembly 80 to move smoothly toward the working portion 21 of the first handle 20, subject to the guidance of the two sliding guide members 86, to the position where the cutter blade 84 is abutted against the anvil 25 to finish the cutting action, as shown in FIG. 4. Once the user releases the pressure from the first handle 20 and the second handle 30, the first handle 20 and the second handle 30 will be immediately returned to their former open status by the elastic member 50, and at the same time, the cutter blade assembly 80 will also be returned to its former position, as shown in FIG. 3.

Figure 5:
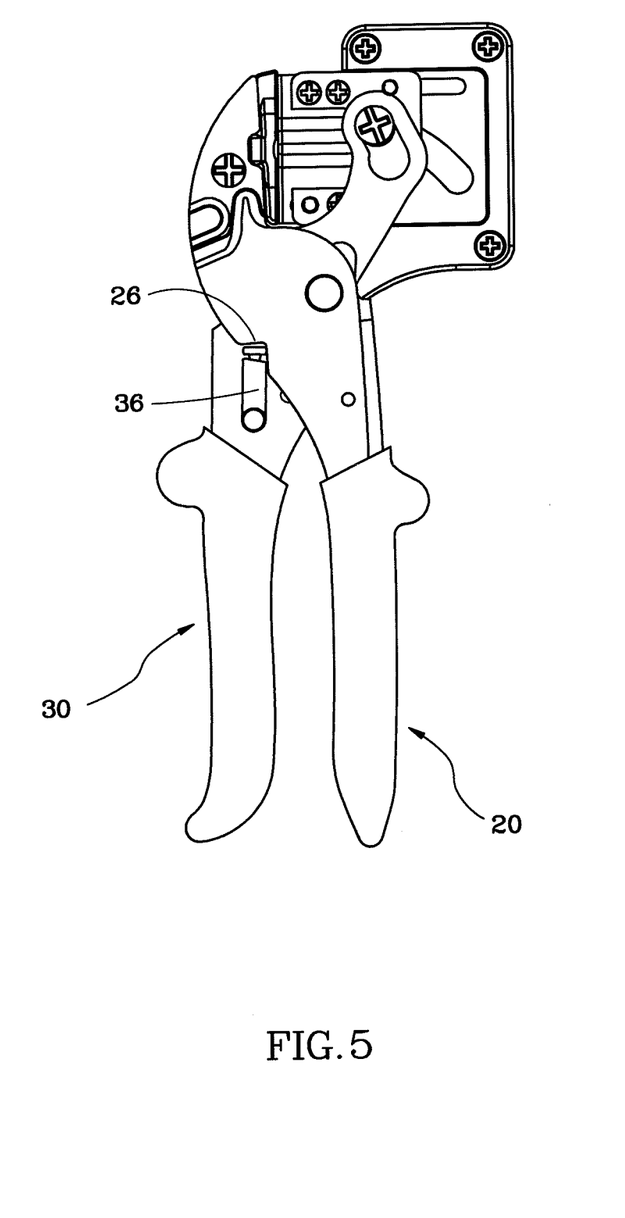
FIG. 5 is similar to FIG. 4, illustrating the positioning member engaged into the locating notch.

To avoid accidental injury from the cutter blade 84, as shown in FIG. 5, a locating notch 26 is formed on the middle part of the first handle 20, and a positioning member 36 is pivotally mounted at the middle part of the second handle 30. After each use of the grafting pruner, the first handle 20 and the second handle 30 can be held in the operating status, and then move the positioning member 36 to engage its one end into the locating notch 26 of the first handle 20, stopping the first handle 20 and the second handle 30 from pivot movement relative to each other, thereby enhancing the safety of the grafting pruner in the non-use status.

Figure 6:
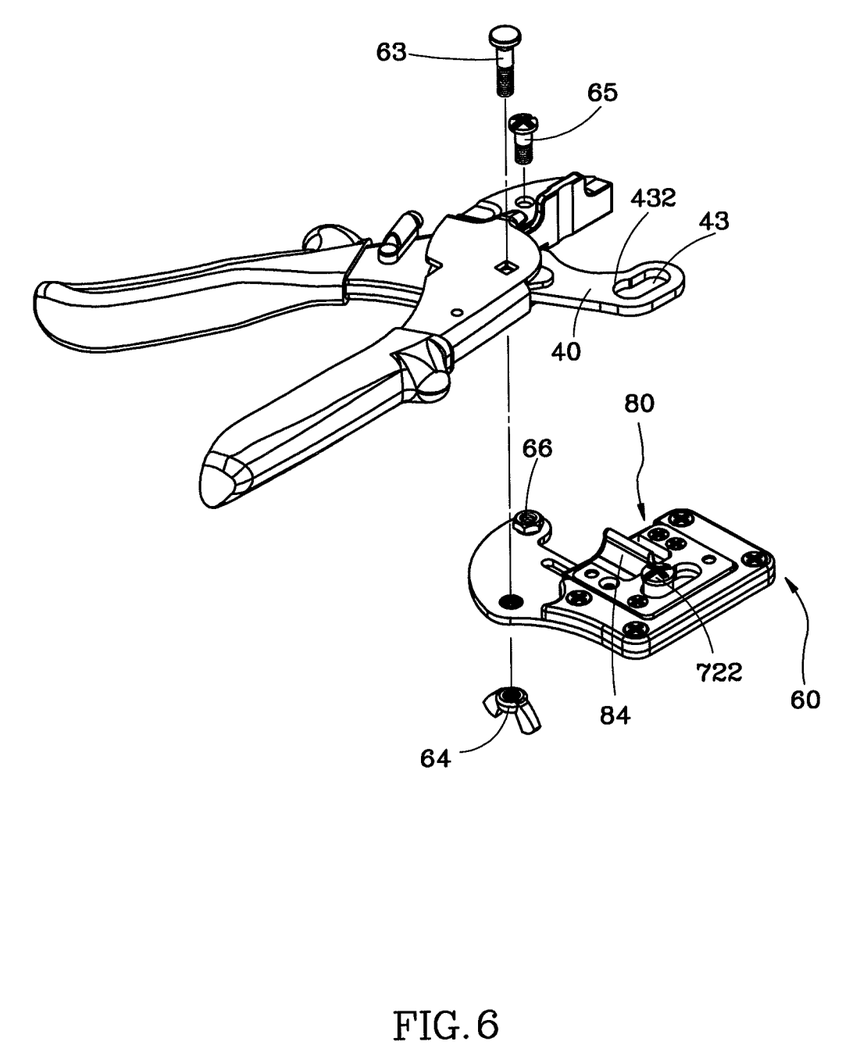
FIG. 6 is a partial exploded view of the first embodiment of the present invention, illustrating the fixed cutter holder and the cutter blade assembly detached from the first and second handles for change of the cutter blade.

If the user needs to change the cutter blade 84, as shown in FIG. 6, the user can unfasten the first screw nut 64 from the first screw bolt 63 and the second screw nut 66 from the second screw bolt 65, and then move the fixed cutter holder 60 and the cutter blade assembly 80 upwards to lift the head 722 of the third screw bolt 72 of the pivot device 70 to the large diameter end 432 of the axle hole 43 of the link 40. Because the diameter of the head 722 of the third screw bolt 72 is smaller than the large diameter end 432 of the axle hole 43, the user can remove the third screw bolt 72 of the pivot device 70 from the axle hole 43 of the link 40 easily at this time to detach the fixed cutter holder 60 and the cutter blade assembly 80, allowing change of the cutter blade 84.

Figure 7:
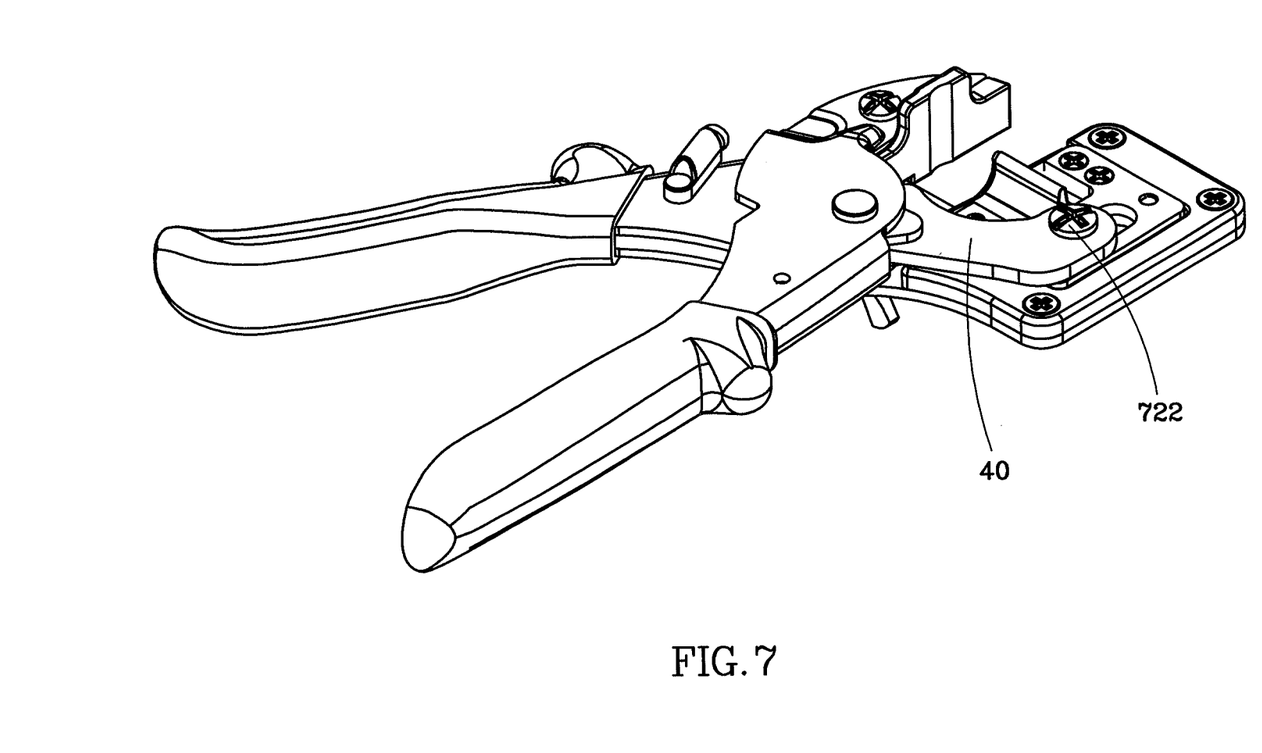
FIG. 7 is an perspective view of a grafting pruner in accordance with a second embodiment of the present invention.
Figure 8:
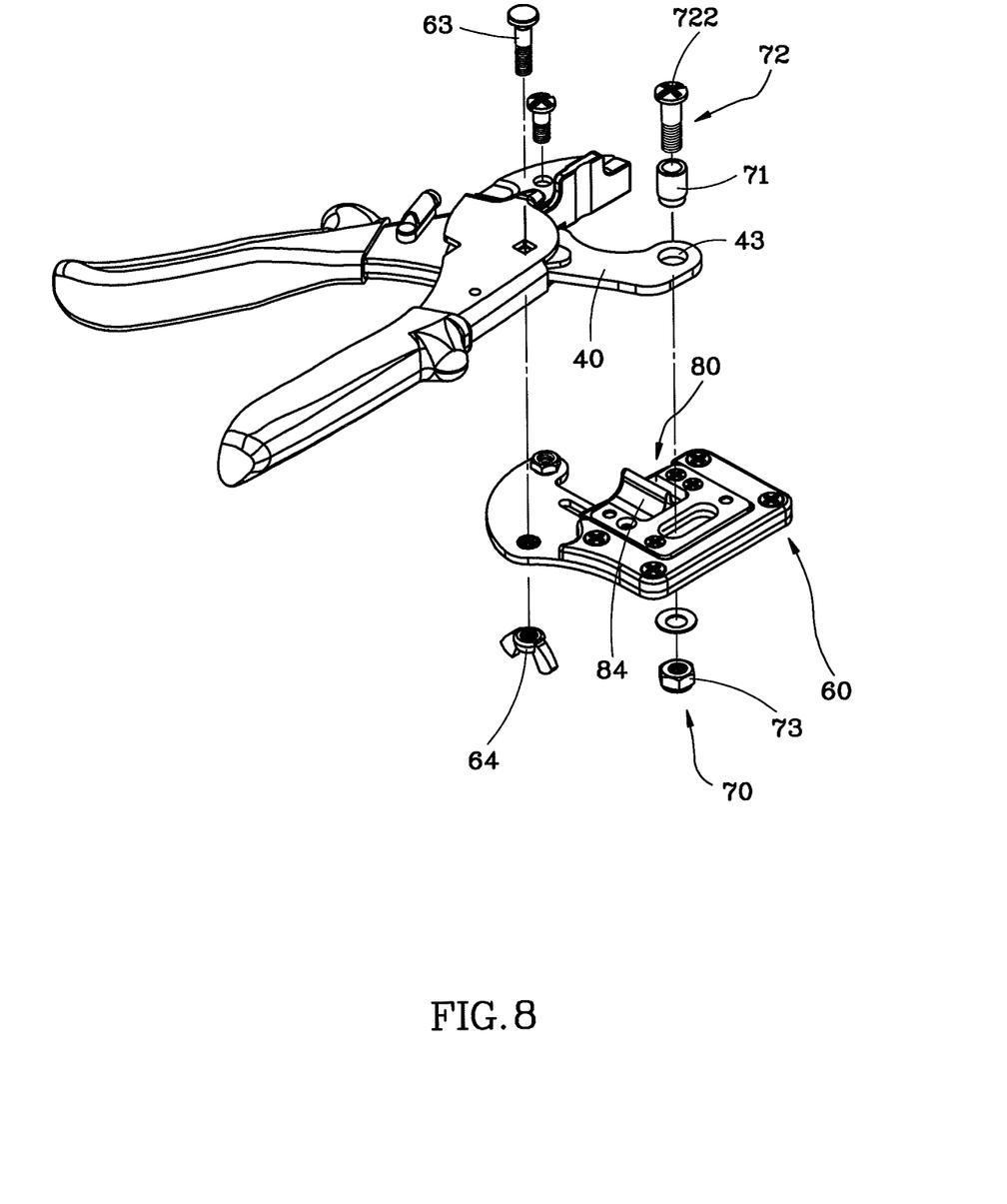
FIG. 8 is a partial exploded view of the second embodiment of the present invention, illustrating the fixed cutter holder and the cutter blade assembly detached from the first and second handles for change of the cutter blade.

On the other hand, the structure of the invention can be variously embodied. In an alternate form of the present invention, as shown in FIGS. 7 and 8, the axle hole 43 of the link 40 is made in the form of a circular hole instead of the aforesaid elongated shape, further, the head 722 of the third screw bolt 72 of the pivot device 70 has a diameter greater than the axle hole 43 and is exposed outside the axle hole 43. Under these conditions, the user needs to, in order to change the cutter blade 84, unfasten the first screw nut 64 from the first screw bolt 63 and the second screw nut 66 from the second screw bolt 65 as well as the third screw nut 73 from the third screw bolt 72 of the pivot device 70, and then to remove the second bushing 71, as shown in FIG. 8, so that the fixed cutter holder 60 and the cutter blade assembly 80 can be detached from the grafting pruner for allowing change of the cutter blade 84.

In conclusion, the design of the grafting pruner 10 in accordance with the present invention has a compact structure and is convenient to carry. During application, the cutter blade 84 can be changed to fit different application requirements after removal of a few screw bolts and screw nuts. Thus, the user needs not to prepare different grafting pruners having different cutter blades, saving much the cost and enhancing the convenience of use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A grafting pruner, comprising:
   a first handle comprising a working portion located on a top end thereof and a first grip located on a bottom end thereof;
   a second handle pivotally connected with a top end thereof to said first handle, said second handle comprising a second grip located on a bottom end thereof corresponding to the first grip of said first handle;

a link fixedly connected with a bottom end thereof to the top end of said second handle and synchronously biasable with said second handle relative to said first handle, said link comprising an axle hole at a top end thereof;

a fixed cutter holder affixed to one side of said working portion of said first handle, said fixed cutter holder comprising an arched sliding slot disposed in communication with said axle hole of said link;

a pivot device inserted through said axle hole of said link and said arched sliding slot of said fixed cutter holder to connect said link and said fixed cutter holder together, said pivot device being movable along said arched sliding slot of said fixed cutter holder upon forced by said link; and a cutter blade assembly comprising a movable cutter holder disposed between said link and said fixed cutter holder and a cutter blade affixed to said movable cutter holder, said movable cutter holder comprising a longitudinal sliding slot disposed in communication with said axle hole of said link and said arched sliding slot of said fixed cutter holder and coupled to said pivot device for allowing said movable cutter holder to be pushed by said pivot device to move said cutter blade relative to said working portion of said first handle.

2. The grafting pruner as claimed in claim 1, wherein said fixed cutter holder comprises at least one transverse sliding slot, and at least one sliding guide member is disposed between the fixed cutter holder and the movable holder, the at least one sliding guide member is respectively slidably coupled to said at least one transverse sliding slot.

3. The grafting pruner as claimed in claim 2, wherein said fixed cutter holder comprises two transverse sliding slots respectively disposed at opposing top and bottom sides relative to said arched sliding slot, and two sliding guide members respectively slidably coupled to said two transverse sliding slots.

4. The grafting pruner as claimed in claim 1, further comprising an elastic member accommodated inside said first handle and adapted to impart a force to said second handle against said first handle, said elastic member having one end thereof affixed to said first grip of said first handle and an opposite end thereof stopped against the bottom end of said link.

5. The grafting pruner as claimed in claim 1, wherein said first handle further comprises an anvil located on said working portion for stopping against said cutter blade.

6. The grafting pruner as claimed in claim 1, wherein said fixed cutter holder comprises an accommodation open chamber disposed in communication with said arched sliding slot and adapted to accommodate said movable cutter holder.

7. The grafting pruner as claimed in claim 1, wherein said first handle further comprises a locating notch; said second handle further comprises a positioning member pivotally mounted thereon corresponding to said locating notch of said first handle and engageable into said locating notch of said first handle to prohibit relative motion between said first handle and said second handle.

8. The grafting pruner as claimed in claim 1, wherein said axle hole of said link is a circular hole; said pivot device comprises a bushing, a screw bolt and a screw nut, said bushing being inserted through said axle hole of said link and said arched sliding slot of said fixed cutter holder and said longitudinal sliding slot of said movable cutter holder, said screw bolt comprising a head and a threaded shank extended from one side of said head, said head having a diameter greater than said axle hole and being disposed outside said axle hole, said threaded shank being inserted through said bushing to the outside of said fixed cutter holder, said screw nut being threaded onto said threaded shank to secure said screw bolt to said fixed cutter holder, said movable cutter holder and said link.

9. The grafting pruner as claimed in claim 1, wherein said axle hole of said link is an elongated hole defining a large diameter end and a small diameter end; said pivot device comprises a bushing, a screw bolt and a screw nut, said bushing being inserted through said axle hole of said link and said arched sliding slot of said fixed cutter holder and said longitudinal sliding slot of said movable cutter holder, said screw bolt comprising a head and a threaded shank extended from one side of said head, said head having a diameter greater than said small diameter end of said axle hole but smaller than said large diameter end, said threaded shank being inserted through said bushing to the outside of said fixed cutter holder, said screw nut being threaded onto said threaded shank to secure said screw bolt to said fixed cutter holder, said movable cutter holder and said link.

10. The grafting pruner as claimed in claim 1, wherein the second handle comprises a clamping slot disposed at the top end thereof and a locating hole disposed in communication with the clamping slot, the link having a locating notch at the bottom end thereof, the bottom end of the link being inserted into the clamping slot, a wedge block being disposed between the locating hole of the second handle and the locating notch of the link for coupling the second handle with the link.

* * * * *